United States Patent Office 3,514,971
Patented June 2, 1970

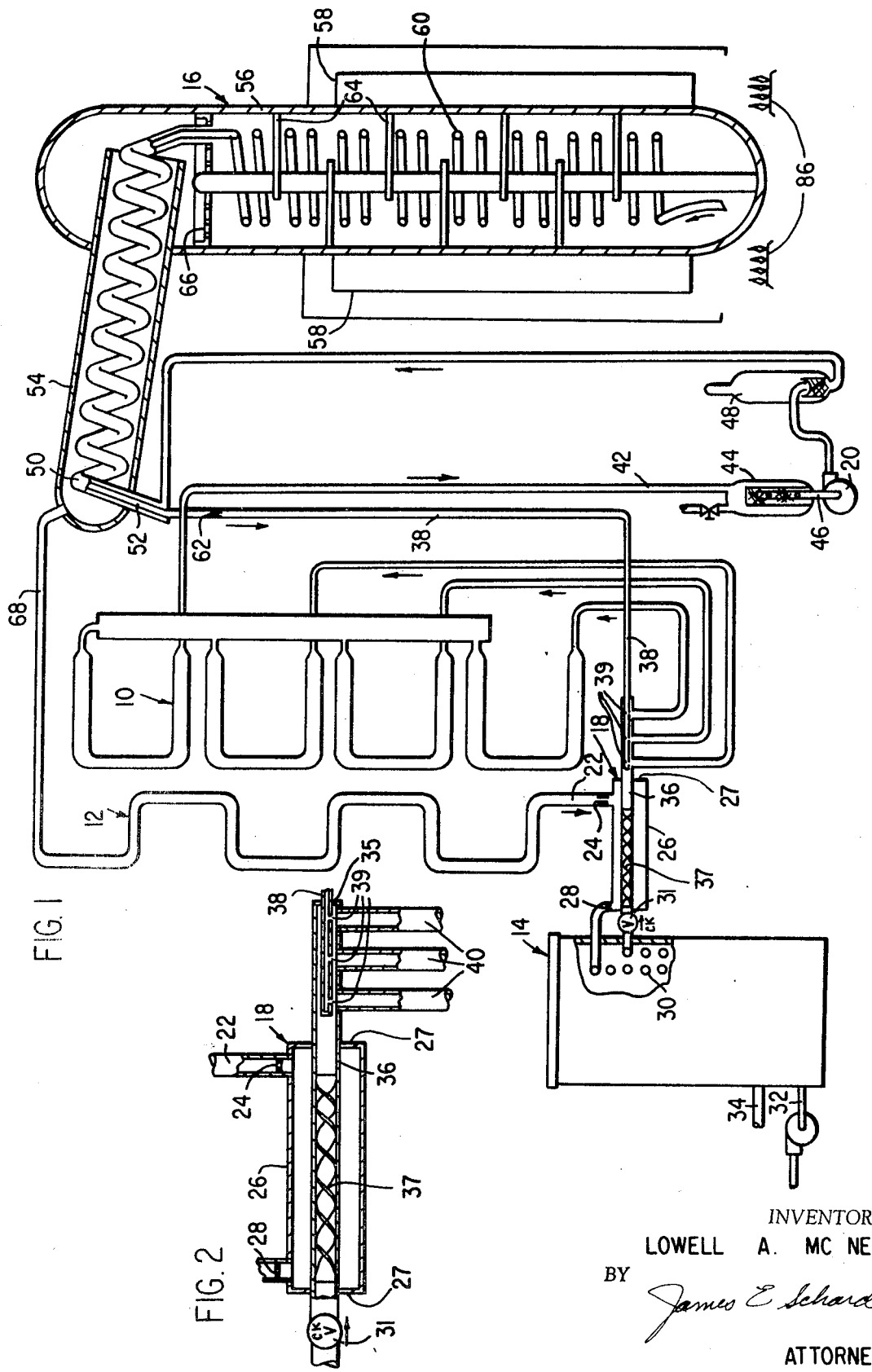

3,514,971
ABSORPTION REFRIGERATION MACHINE
Lowell A. McNeely, Indianapolis, Ind., assignor to Carrier Corporation, Syracuse, N.Y., a corporation of Delaware
Filed Sept. 3, 1968, Ser. No. 756,812
Int. Cl. F25b 15/00
U.S. Cl. 62—476        4 Claims

ABSTRACT OF THE DISCLOSURE

An absorption refrigeration system employing a liquid and gas refrigerant heat exchanger having combined therewith a distributor to provide a mixture of refrigerant vapor and strong solution to separate circuits of a multi-circuit absorber.

BACKGROUND OF THE INVENTION

In absorption refrigeration machines employing air cooled absorbers having a number of circuits therethrough, it is desirable to mix refrigerant vapor from the evaporator with strong solution from the generator prior to passage to the absorber. So doing assures that adequate proportions of vapor and strong solution are provided to each absorber circuit to increase performance of the absorption refrigeration machine. It is also desirable that the cooled refrigerant vapor leaving the evaporator be placed in heat exchange relation with refrigerant condensate being supplied to the evaporator to further cool the condensate before its entry into the evaporator.

SUMMARY OF THE INVENTION

The present invention provides an absorption refrigeration system in which a liquid refrigerant and gas refrigerant heat exchanger is provided in combination with a distributor which assures that adequate proportions of refrigerant vapor and strong solution are supplied to separate circuits of the absorber. The system includes a first tubular member adapted to pass liquid refrigerant from the condenser to the evaporator, a second tubular member disposed therein for passing refrigerant vapor from the evaporator in heat exchange relation with the liquid refrigerant passed through the first tubular member and a third tubular member disposed within the second tubular member having a plurality of openings therein aligned with a plurality of absorber supply tubes communicating with the second tubular member for passage of strong solution from the third tubular member through the second tubular member into the supply tubes to induce refrigerant vapor from the second tubular member into the absorber supply tubes. The supply tubes communicate with the circuits of the absorber to provide a mixture of strong solution and refrigerant vapor thereto.

BRIEF DESCRIPTION OF THE DRAWINGS

FIG. 1 is a schematic diagram of an absorption refrigeration system; and

FIG. 2 is an enlarged partially sectional view of the combined heat exchanger-vapor distributor employed with the absorption refrigeration system of FIG. 1.

DESCRIPTION OF THE PREFERRED EMBODIMENT

Referring to FIG. 1 of the drawings, there is shown a refrigeration system comprising an absorber 10, a condenser 12, an evaporator or chiller 14, a generator 16 and a liquid-suction heat exchanger-vapor distributor 18 connected to provide refrigeration. A pump 20 is employed to circulate weak absorbent solution from absorber 10 to generator 16.

As used herein, the term "weak absorbent solution" refers to solution which is weak in absorbent power and the term "strong absorbent solution" refers to a solution which is strong in absorbent power. A suitable absorbent for use in the system described is water; a suitable refrigerant is ammonia.

Liquid refrigerant condensed in condenser 12 passes through refrigerant liquid passage 22 to the liquid suction heat exchanger portion of heat exchanger-vapor distributor 18. Heat exchanger-vapor distributor 18 includes a heat exchange tube 26 having a refrigerant restrictor 24 therein at the upstream end thereof and a refrigerant restrictor 28 at the downstream end thereof. A portion of the refrigerant supplied to heat exchanger-vapor distributor 18 flashes upon passing through restrictor 24 due to the lower pressure existing downstream of the restrictor, thereby cooling the remainder of the refrigerant in heat exchange tube 26. The cooled refrigerant liquid and flashed refrigerant vapor then pass through restrictor 28 into heat exchanger 30 of chiller 14.

A heat exchange medium such as water is passed over the exterior of heat exchanger 30 where it is chilled by giving up heat to evaporate the refrigerant within the heat exchanger. The chilled heat exchange medium passes out of chiller 14 through line 32 to suitable remote heat exchangers (not shown) after which it is returned to the chiller through inlet 34 for rechilling.

The cold refrigerant evaporated in heat exchanger 30 along with a small quantity of absorbent which is carried over to the chiller with the refrigerant from the generator passes through check valve 31 into refrigerant vapor passage 36 of heat exchanger-vapor distributor 18. Heat exchanger-vapor distributor 18 is provided with a check valve 31 to prevent absorber solution from backing up into the chiller upon shut-down. This prevents the warm liquid from the absorber from heating up the chiller and assures a sufficient quantity of liquid in the remainder of the system to allow subsequent start-up of the machine.

The refrigerant vapor and absorbent liquid, which has a large quantity of refrigerant absorbed therein, passes through tubular member 36 in heat exchange relation with liquid refrigerant passing through tube 26. Tubular member 36 is provided with a turbulator 37 which consists of a twisted metal strip to provide a tortuous flow path for the vapor to provide optimum heat transfer between the vapor and liquid in member 36 and the liquid refrigerant in tube 26. By passing the vapor and liquid in member 36 in heat transfer with the liquid refrigerant in tube 26, a large quantity of the refrigerant in the absorbent liquid in tubular member 36 is vaporized. The heat of vaporization is therefore removed from the liquid in tube 26, thereby reducing the temperature of the liquid refrigerant supplied to heat exchanger 30. Strong solution which is supplied from the generator to heat exchanger-vapor distributor 18 through line 38 is discharged through orifices 39 into absorber supply tubes 40 to induce refrigerant vapor from passage 36 into tubes 40.

The heat exchanger-vapor distributor 18 serves a threefold purpose. It provides an increase in the machine efficiency by transferring heat from the liquid supplied thereto from the condenser to the refrigerant vapor and absorbent liquid discharged from the chiller. It prevents absorbent solution from backing up into the chiller upon shutdown and distributes refrigerant vapor into the strong solution supplied to the vapor distributor from the generator for passage to the absorber. The strong solution with the refrigerant vapor therein is supplied to absorber 10 where cooling medium, preferably ambient air is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

It can be seen from the foregoing that the liquid suction heat exchanger-vapor distributor is comprised of an external tubular member 26 having a second tubular member 36 disposed therein. A third tubular member 38 is disposed within the portion of tubular member 36 which projects beyond the end of tubular member 26. The tubular member 26 is provided with an inlet having a restrictor 24 therein for communication with refrigerant condensate line 22 and a discharge opening having a restrictor 28 therein for communication with the evaporator. Tubular member 36 which is adapted to receive refrigerant from evaporator coil 30 is provided with a check valve 31 exteriorly of tubular member 26 and a turbulator 37 in the portion of tubular member 36 disposed within tubular member 26. Tubular member 36 is suitably affixed to the end walls 27 of tubular member 26 as by brazing. The pick up tubes 40 which communicate with the portion of tubular member 36 which projects from tubular member 26 are suitably affixed thereto as by brazing. Tubular member 38 having discharge openings 39 therein in alignment with pick up tubes 40 is suitably affixed to the end wall 35 of tubular member 36 as by brazing. The described construction provides a simple, compact heat exchanger-vapor distributor which is efficient, easy to manufacture and very inexpensive.

Cold weak absorbent solution passes from absorber 10 through a line 42 into pump inlet tank 44. Weak solution from inlet tank 44 is supplied to weak solution pump 20 through line 46. Liquid from pump 20 passes through pump discharge tank 48 to rectifier heat exchange coil 50. The weak solution passes through coil 50 in heat exchange relation with hot strong solution passing through heat exchanger coil 52 disposed within coil 50 and with the hot refrigerant vapor flowing through rectifier shell 54 in contact with the outer surface of coil 50. The weak solution from coil 50 is discharged into the upper portion of generator 16 along with any vapor which is formed in coil 50 due to heat exchange with the hot vapor passing thereover and the hot solution flowing therethrough.

Generator 16 comprises a shell 56 having fins 58 suitably affixed thereto as by welding. The generator is heated by a gas burner 86 or other suitable heating means. The weak solution is boiled in generator 16 to concentrate the solution thereby forming a strong solution and refrigerant vapor.

The hot strong absorbent solution passes upwardly through the analyzer section of generator 16 through analyzer coil 60 in heat exchange with weak solution passing downwardly over the coil. The warm strong solution then passes through heat exchange coil 52 within coil 50, line 38 into liquid suction heat exchanger-vapor distributor 18. A restrictor 62 is provided in line 38 so that the solution supplied to heat exchanger-vapor distributor 18 is at the same pressure as the vapor in passage 36.

Refrigerant vapor formed in generator 16 passes upwardly through the analyzer section thereof where it is concentrated by mass heat transfer with weak solution passing downwardly over analyzer coil 60. Analyzer plates 64 in generator 16 provide a tortuous path for flow of solution and vapor to assure intimate contact therebetween to improve the mass heat transfer. The refrigerant vapor from the analyzer section passes through reflux plate 66 in heat exchange relation with absorbent condensed within rectifier 54. The vapor then passes through rectifier 54 in heat exchange relation with the weak solution passing through coil 50. Absorbent condensed in rectifier 54 flows downwardly onto plate 66 where it is heated by the refrigerant vapor passing therethrough. The heated absorbent is then passed to the generator along with the weak solution discharged into the generator from coil 50. Refrigerant vapor passes from rectifier 54 through line 68 to condenser 12 to complete the refrigeration cycle.

While I have described a preferred embodiment of my invention, it is to be understood the invention is not limited thereto since it may be otherwise embodied within the scope of the following claims.

I claim:
1. An absorption refrigeration system having a generator and condenser on the high pressure side and an absorber and evaporator on the low pressure side thereof connected to provide refrigeration,
   a liquid suction heat exchanger-vapor distributor for cooling liquid refrigerant prior to its passage to said evaporator and for mixing refrigerant vapor with strong solution from the generator including a first tubular member adapted to pass liquid refrigerant from said condenser to said evaporator,
   a second tubular member disposed within said first tubular member for passing refrigerant vapor from said evaporator in heat exchange relation with the liquid refrigerant passed through said first tubular member,
   a third tubular member disposed within said second tubular member for passage of strong solution therethrough,
   means communicating with said second tubular member for passage of solution and refrigerant vapor from said second tubular member to said absorber, and
   means for passing strong solution from said third tubular member through said second tubular member to said means communicating with said second tubular member to induce refrigerant vapor from said second tubular member into said means communicating with said second tubular member.

2. An absorption refrigeration system according to claim 1 wherein said means communicating with said second tubular member for passage of solution and refrigerant vapor to said absorber includes a plurality of absorber supply tubes communicating with said second tubular member and said absorber,
   said means for passing strong solution from said third tubular member through said second tubular member to said absorber supply tubes comprising a plurality of orifices disposed in said third tubular member opposite said absorber supply tubes to distribute solution from said third tubular member into said absorber supply tubes.

3. An absorption refrigeration system according to claim 2 wherein said heat exchanger-vapor distributor further includes a first refrigerant restrictor disposed between said first tubular member and said condenser and a second refrigerant restrictor disposed between said first tubular member and said evaporator, said restrictors causing a first portion of liquid refrigerant to flash in said first tubular member and the remainder of the refrigerant liquid supplied thereto to flash in said evaporator.

4. An absorption refrigeration system according to claim 3 wherein said heat exchanger-vapor distributor further includes a check valve disposed between said evaporator and said second tubular member to prevent absorber solution from entering the evaporator upon shutdown of the machine.

References Cited

UNITED STATES PATENTS 2,452,699   11/1948   Sutton _____ 62—486 X

LLOYD L. KING, Primary Examiner

U.S. Cl. X.R.
62—468, 492